May 22, 1945.  R. D. YORK  2,376,469

NUT SHELLER

Filed Oct. 26, 1944

Inventor
Raymond Dewey York

By Clarence A. O'Brien
and Harvey B. Jacobson
Attorneys

Patented May 22, 1945

2,376,469

UNITED STATES PATENT OFFICE 2,376,469

NUT SHELLER

Raymond Dewey York, San Angelo, Tex.

Application October 26, 1944, Serial No. 560,440

4 Claims. (Cl. 146—16)

This invention relates to a nut sheller, and more particularly to a sheller adapted to be utilized with pecans.

A primary object of this invention is the provision of an improved device adapted to shell, pick, and split pecans.

An additional object is the provision of such a device provided with means whereby the scattering of the shell fragments from the nuts is precluded.

Still another object is the provision of such a device having improved means for removing the shells from nuts such as pecans or the like.

A further and more specific object is the provision of such a device provided with resilient means for returning the same to open position after use.

Other objects will in part be obvious and in part be pointed out as the description of the invention proceeds and shown in the accompanying drawing, wherein there is disclosed a preferred embodiment of this inventive concept.

In the drawing.

Like reference numerals refer to like parts throughout the several views of the drawing.

Figure 1:
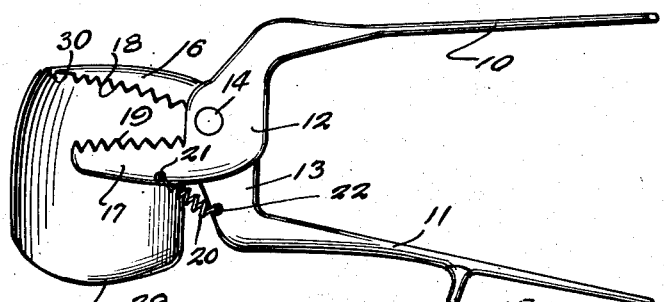
Figure 1 is a top plan view of one form of device embodying features of this invention.

Having reference now to the drawing, there are provided two handle members 10 and 11, each having an offset portion 12, and 13, respectively, which offset portions are provided with aligned transverse bores through which is passed a pin or rivet 14 having its heads suitably countersunk, in such manner that the handles 10 and 11 are pivotally secured to each other. Handle 11 is provided with a finger-grip portion 15.

Each of members 10 and 11 are provided with extending jaw portions 16 and 17, provided with teeth 18 and 19, respectively. A spring 20 having its extremities in apertures or bores 21 and 22 in jaw portion 17, and offset portion 13, respectively, serves to bias the jaws away from each other, about the pivot 14.

Figure 5:
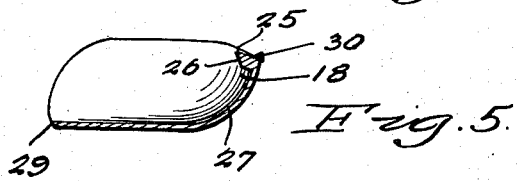
Figure 5 is a sectional view taken substantially along the line 5—5 of Figure 2 as viewed in the direction indicated by the arrows.
Figure 2:
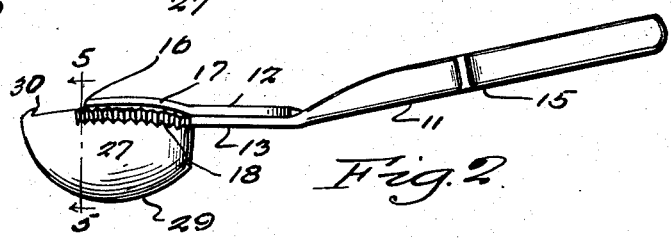
Figure 2 is a side elevational view of the device shown in Figure 1.
Figure 3:
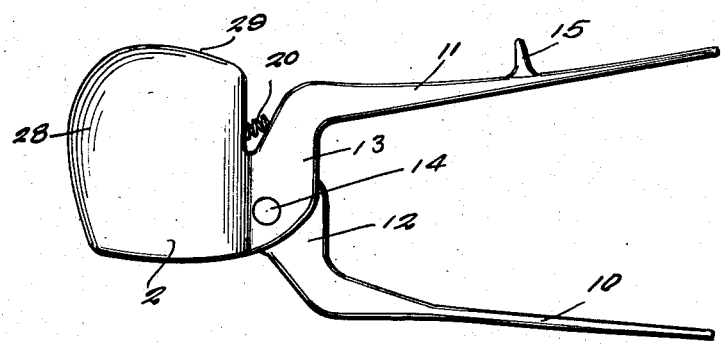
Figure 3 is a bottom plan view of the device shown in Figures 1 and 2.
Figure 4:
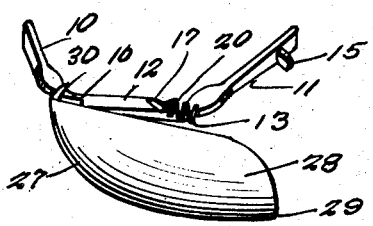
Figure 4 is an end elevational view of the device.

Referring back to teeth 18, it will be seen that they are serrated horizontally as best shown in Figure 1 as well as tapered vertically as best shown in Figures 2 and 5, in such manner that each cutting tooth is provided with a piercing point 25 and a cutting edge 26.

Integral with or secured to the underside of jaw member 16 is an arcuate surface 27, which curves into a semi-cylindrical guard or receptacle 28, adapted closely to underlie the jaws of the device and serve to retain the shells peeled from the nuts. The outer end of semi-cylindrical member 28 terminates in a relatively sharpened edge 29 which may be utilized for separating the halves of the shelled nuts, or otherwise cutting the nut meat. Up-struck from the upper edge of the arcuate surface 27, at a point beyond the last of teeth 18 of jaw 16 is a pointed projection 30, which may be utilized as a pick to remove bitters, wood and the like from grooves and sutures in the nut meat.

Now from the foregoing it will be understood that there is herein provided an improved device for removing the shells from nuts such as pecans or the like, which may also be utilized to clean the remaining bits of shell from the sutures or grooves in the nuts, and which is provided with a receptacle adapted to retain the severed portions of the shell to permit convenient depositing of the same in a suitable receptacle. It will also be seen that the device may be utilized merely to crack the shell of different types of nuts desired, and correspondingly that the edge of the shell retaining member may be utilized as a knife to sever the halves of nut meat.

It will also be seen that there is herein provided a device accomplishing all the objects of this invention and others including many advantages of great practical utility and commercial importance.

As many embodiments may be made of this inventive concept and as many modifications may be made in the embodiment hereinbefore shown and described, it is to be understood that all matters herein is to be interpreted merely as illustrative and not in a limiting sense.

I claim:

1. In a device of the character described, a pair of handle members pivoted at an intermediate point, oppositely disposed jaws extending from said handle members, an arcuate surfaced portion depending from one of said jaws and extending under and about said jaws in the form of a semi-cylindrical portion, and a projecting pick on the upper edge of said arcuate surfaced portion.

2. In a device of the character described, a pair of handle members pivoted at an intermediate point, oppositely disposed jaws extending from said handle members, an arcuate surfaced portion depending from one of said jaws and extending under and about said jaws, a projecting pick on the upper edge of said arcuate surfaced member and a cutting edge at the extremity of said semi-cylindrical portion.

3. In a device of the character described, a pair of handle members pivoted at an intermediate point, oppositely disposed jaws extending from said handle members, each of said jaws being provided with a row of teeth, said teeth each having a cutting point and an inclined cutting edge extending from said point in a plane vertical to the plane of said rows of teeth, an arcuate surfaced portion depending from one of said jaws and extending beneath said teeth in the form of a semi-cylindrical portion, and a projecting pick on the upper edge of said arcuate member adjacent the extremity of one of said rows of teeth.

4. In a device of the character described, a pair of handle members pivoted at an intermediate point, oppositely disposed jaws extending from said handle members, each of said jaws being provided with a row of teeth, said teeth each having a cutting point and an inclined cutting edge extending from said point in a plane vertical to the plane of said rows of teeth, an arcuate surfaced portion depending from one of said jaws and extending beneath said teeth in the form of a semi-cylindrical portion, a projecting pick on the upper edge of said arcuate member adjacent the extremity of one of said rows of teeth, and a cutting edge at the extremity of said semi-cylindrical portion.

RAYMOND DEWEY YORK.